Dec. 27, 1932.  G. G. SATRUM  1,892,474
ROTARY GAS ENGINE
Filed Oct. 23, 1931  4 Sheets-Sheet 1
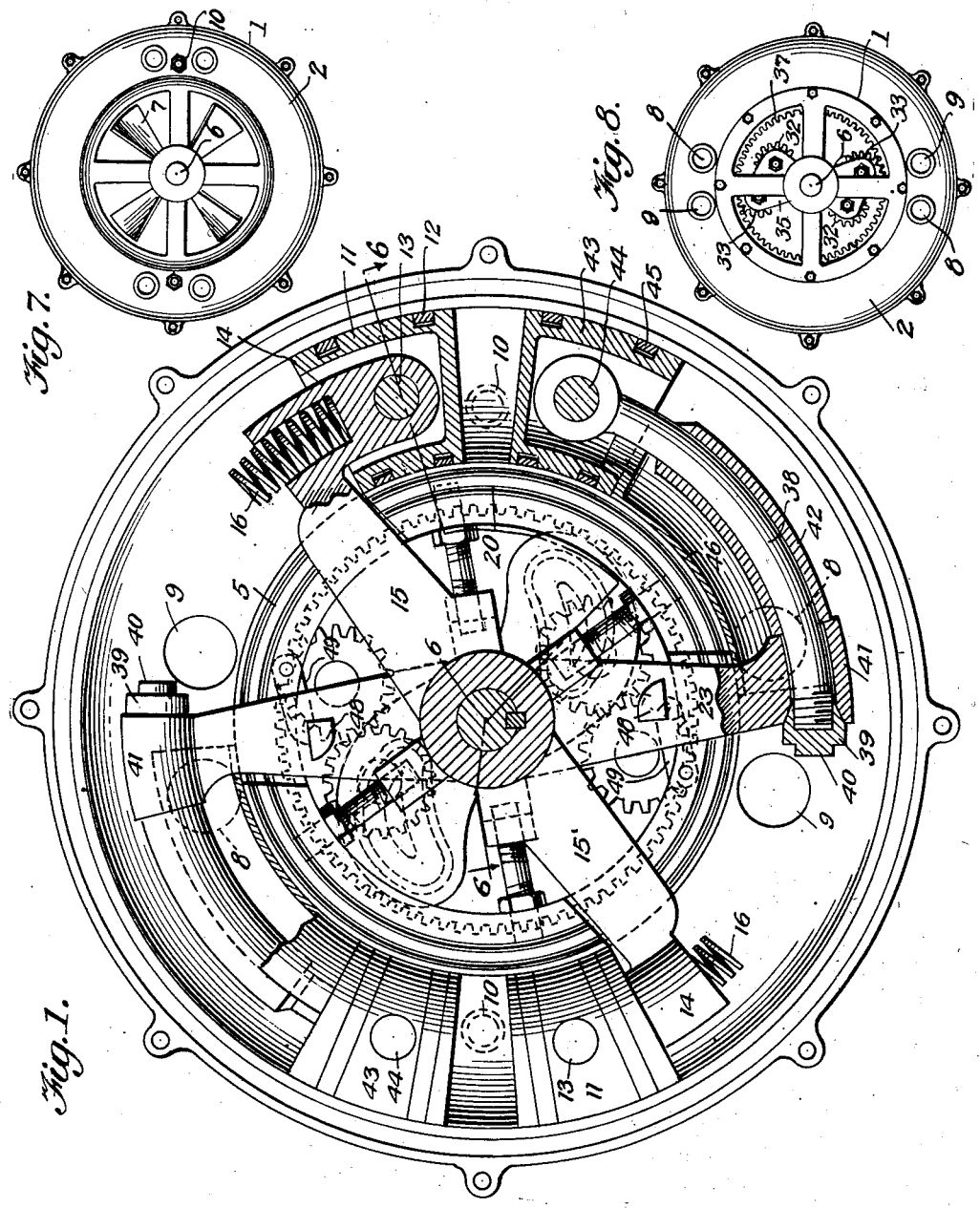
Gilbert G. Satrum
INVENTOR
BY Victor J. Evans
and Co.  ATTORNEYS Dec. 27, 1932.  G. G. SATRUM  1,892,474
ROTARY GAS ENGINE
Filed Oct. 23, 1931  4 Sheets-Sheet 2
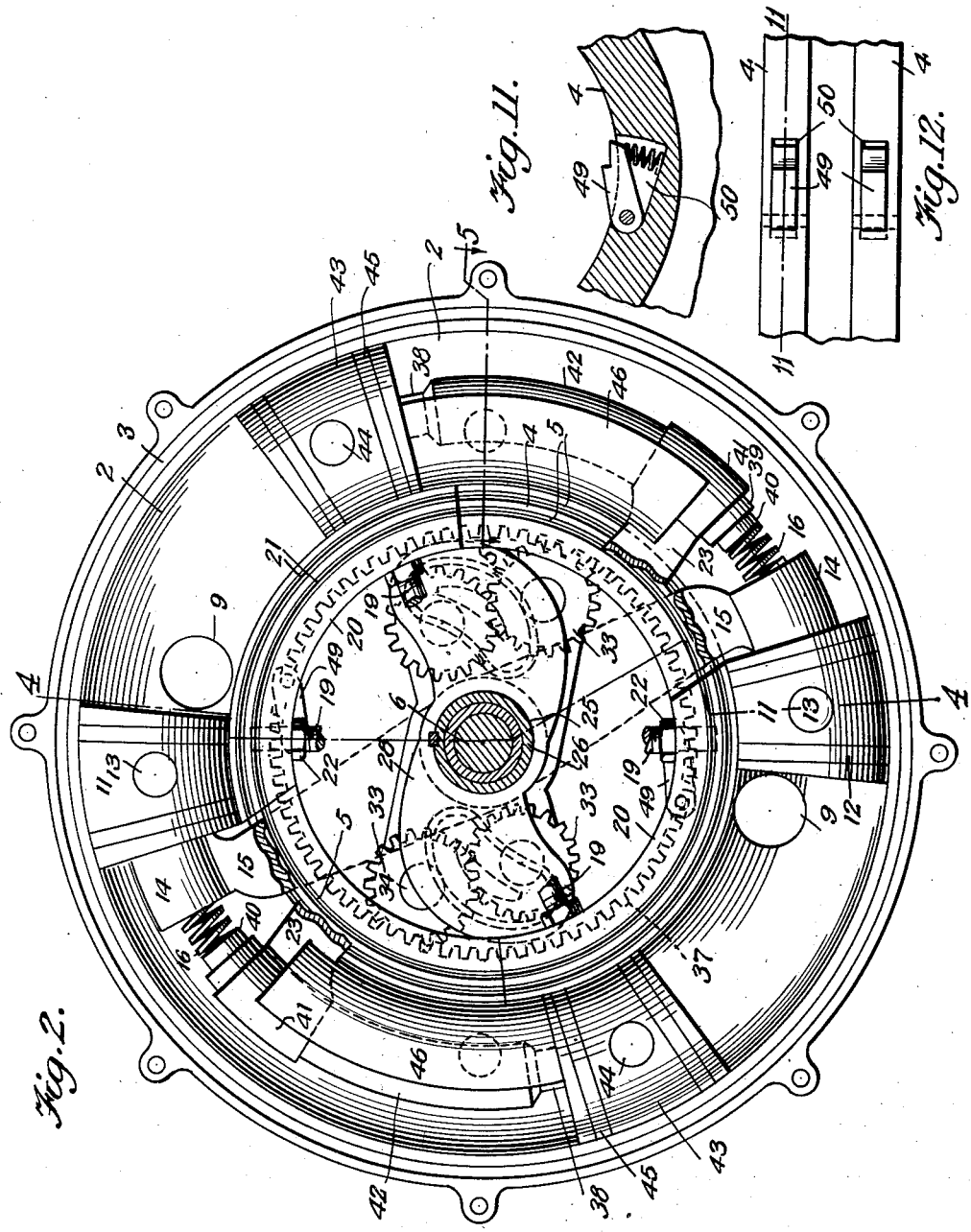
Gilbert G. Satrum
INVENTOR
BY Victor J. Evans and Co.
ATTORNEYS Dec. 27, 1932.   G. G. SATRUM   1,892,474
ROTARY GAS ENGINE
Filed Oct. 23, 1931   4 Sheets-Sheet 3
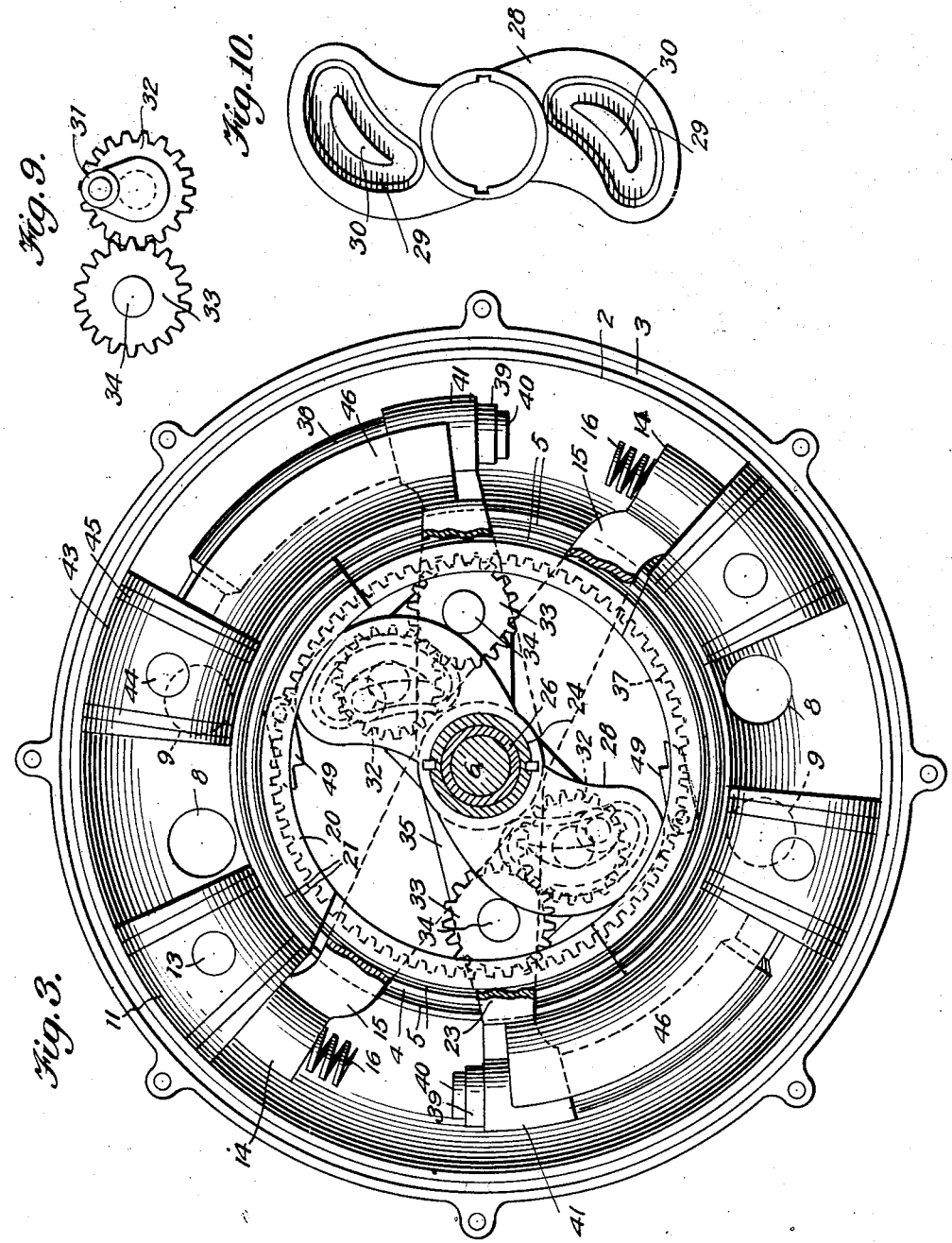
Gilbert G. Satrum
INVENTOR
BY Victor J. Evans and Co.
ATTORNEYS Dec. 27, 1932.  G. G. SATRUM  1,892,474
ROTARY GAS ENGINE
Filed Oct. 23, 1931  4 Sheets-Sheet 4
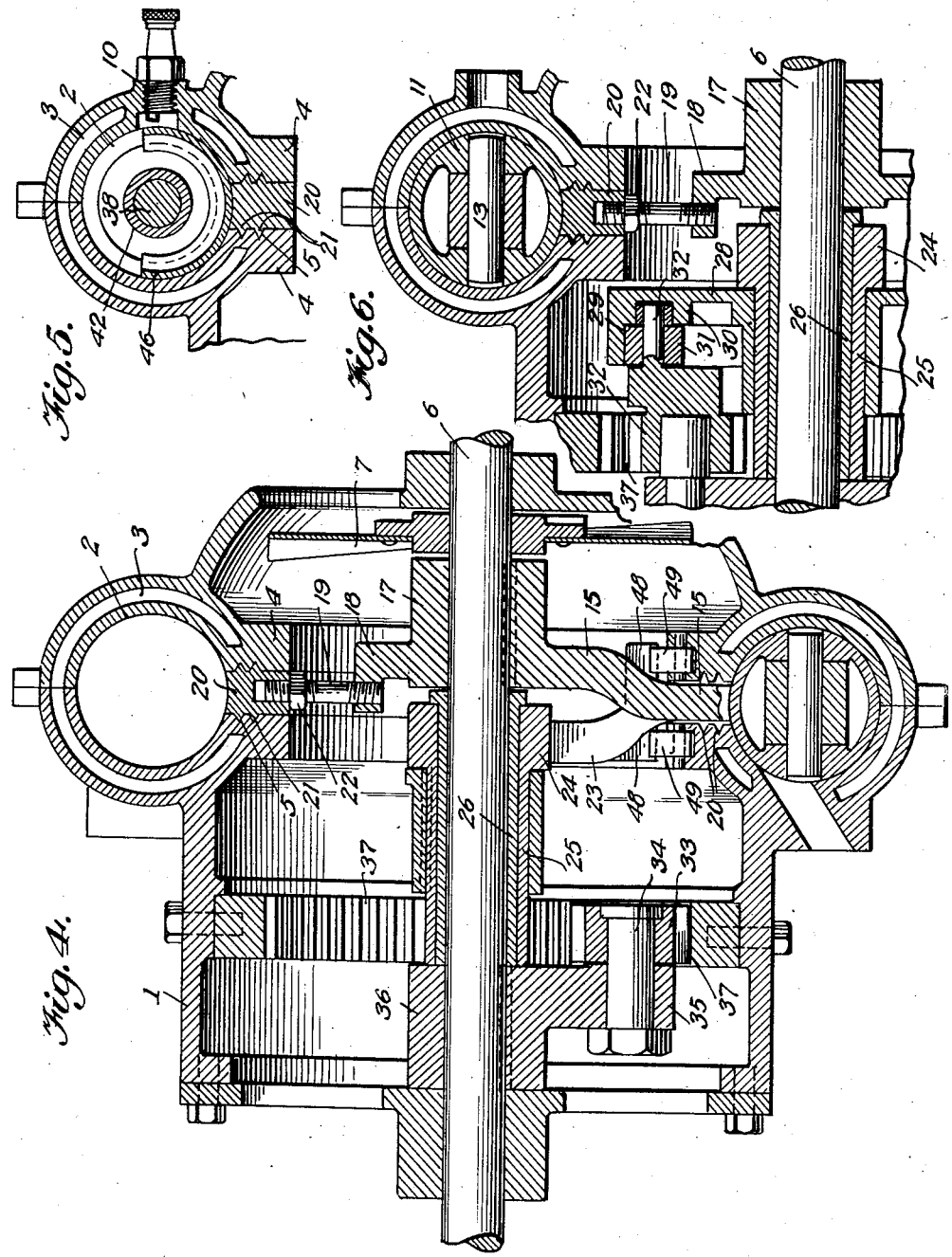
Gilbert G. Satrum
INVENTOR
BY Victor J. Evans
and Co.  ATTORNEYS Patented Dec. 27, 1932

1,892,474

UNITED STATES PATENT OFFICE

GILBERT G. SATRUM, OF CANTON, SOUTH DAKOTA

ROTARY GAS ENGINE

Application filed October 23, 1931. Serial No. 570,687.

My present invention has reference to a rotary engine, and an object is the provision of a rotary engine in which the parts are perfectly balanced, which employs no valves or crank shafts and in which friction between the parts is eliminated as far as possible.

A further object is the provision of a rotary engine that is simple but strong and durable, and in which main pistons are caused to rotate at a constant speed in a cylindrical casing and in which other pistons are caused to intermittently follow the main pistons to scavenge the cylinder after the firing strokes, to close both the intake and exhaust passages and to compress the charge to permit of the firing thereof between the main and compression pistons at determined intervals.

A further object is the provision of a rotary engine which is both air and water cooled.

In the drawings:

Figure 1 is an end view of a rotary engine in accordance with this invention, the head plate being removed from the casing and parts being in section and also showing the pistons arranged at the firing stroke of the engine.

Figure 2 is a similar view to illustrate the main pistons advanced in the rotary movement and the auxiliary of compression pistons moved to scavenge the cylinder.

Figure 3 is a similar view but illustrating a further advance of the pistons to a position wherein the main pistons uncover and suck in the explosive charge.

Figure 4 is an irregular central longitudinal sectional view through the engine taken approximately in a plane with the line 4—4 on Figure 2.

Figure 5 is a detail transverse sectional view through the cylindrical portion of the casing in a line with one of the firing chambers taken approximately in a plane with the line 5—5 on Figure 2.

Figure 6 is another detail sectional view to more clearly illustrate the connection between the ring filler or valve at the open inner end of the cylinder and the drive shaft of the engine as well as to further disclose the timing means for the compression pistons, said section being taken approximately in a plane with the line 6—6 of Figure 1.

Figure 7 is a view looking toward one end of the engine.

Figure 8 is a view looking toward the other end of the engine.

Figure 9 is a plan view to illustrate the intermeshing gears and the rollers carried by one of the gears for travel in the groove cam tracks.

Figure 10 is a plan view of the rotatable member that carries the grooved cam tracks.

Figure 11 is a sectional view taken approximately in a plane with the line 11—11 of Figure 12.

Figure 12 is a fragmentary plan view looking toward the inner face of the cylinder.

The casing 1 is preferably round in cross section and is formed, adjacent one of its ends, with a cylinder 2 which, preferably is projected beyond the periphery of the casing proper. The cylinder is preferably made of two parts, as disclosed by the drawings and such parts are rigidly connected. The cylinder is provided with passages 3 for the circulation of water, and the inner end of the cylinder is provided with a central opening and the said end is formed with an annular projection 4. The opposed walls provided by the opening in the inner end 4 of the cylinder have annular preferably V-shaped grooves 5 arranged in confronting relation, the purpose of which will presently be apparent. The drive shaft for the engine is indicated by the numeral 6 and, of course, is journaled through suitable bearings in the ends of the cylinder, and this shaft has fixed thereon the hub of a fin 7 designed to circulate air through the engine casing, and especially around the cylinder 2.

The cylinder 2, at substantially diametrically opposed points, is provided with fuel intake passages 8—8 and exhaust passages 9—9 for the burnt fuel. Opposite and approximately at a right angle with respect to the rather closely related intake and exhaust passages the cylinder is provided with openings for spark plugs 10.

Arranged for travel in the cylinder 2 there are the main or shaft driving pistons. The piston heads 11 are cylindrical in cross section and have one of their ends open and are provided with peripheral grooves for the reception of piston rings 12 to contact with the walls of the cylinder. A wrist pin 13 passing through the heads connects thereto the angle ends 14 of the rods or arms 15 for the pistons. From their outer ends the angle portions 14 are provided with pockets in which are received and through which project buffer springs 16. The arms 15 are offset, as at 15', from points adjacent their hub 17, it being understood that the arms are integrally formed with the hub and the said hub is splined or otherwise fixedly secured on the shaft 6. The hub 17 at diametrically opposed points is integrally formed with angle lugs 18 that have screwed therein bolts 19. These bolts are also screwed in threaded openings in the inner periphery of segmental ring members 20 that are received in the central groove or space provided at the inner thickened end 4 of the cylinder. The ring segments 20 are provided on their outer faces with substantially V-shaped ribs 21 to be received in the V-shaped annular grooves 5 in the confronting walls of the part 4 of the cylinder. The ring sections 20 thus close the opening or space at the inner periphery of the cylinder, and the bolts 19 are engaged by lock nuts 22 which contact with the inner periphery of the ring sections 20. The spaces between the confronting ends of the ring sections 20 are only sufficient to receive therebetween the rods or arms 15 and other rods or arms 23 for the compression pistons. The arms 23 are formed with a hub 24 provided with a cylindrical extension 25, and this extension is received through a sleeve 26 that has an enlarged inner end which is arranged between the hubs 17 and 24. The hub extension 25 is keyed on the hub 27 of a plate or arm 28. The plate or arm has one of its faces grooved to provide elongated substantially segmental tracks 29, respectively, the depressed portions forming the said tracks being centrally provided with a segmental lug 30 and these tracks are designed to receive therein rollers 31 which are eccentrically pivoted on pinions 32. The pinions 32 are in mesh with other pinions 33 whose shafts 34 are journaled on arms 35 connected by a hub 36 which is splined on the shaft 6. The pinions 33 are in mesh with an internal ring gear 37 which is bolted or otherwise fixed in the casing 11. The elements just described provide the timing mechanism for the follower or compression cylinders.

The arms 23 for the compression or follower pistons are offset so that the outer ends thereof will pass through the passage or opening on the inner periphery of the cylinder 2. These arms have the ends thereof received in the cylinder provided with round heads that have central openings therethrough and received and projecting through each of these openings there is an arched rod 38. The rods have one of their ends threaded and have screwed thereon tapered nuts 39, each of which is provided with an outer round head 40 and the inner tapered portions of the nuts are received in the tapered ends of the heads 41 of the rods or arms 23. The projecting ends of the rods are surrounded by a tubular member or sleeve 42 which is secured thereto, contacts with the heads 41 and braces the said rods. The outer ends of the rods are received in the hollow body portions of the heads 43 for the compression cylinders and connected thereto by pins 44. The heads 43, of course, are round in cross section and are provided with annular grooves for the reception of piston rings 45. The open inner ends of the heads or pistons 43 have secured thereto the flanged or offset ends of cross sectionally rounded skirts 46. The arched and cross sectionally rounded skirts are of a length approximately equaling the distance of the inner hollow ends of the piston heads 43 and their connecting arms 23 so that when the pistons are arranged for the firing stroke, as disclosed by Figure 1 of the drawings one of the intake ports 8 will be closed by the skirt and one of the pistons 43 and the diametrically opposite intake port 8 will be closed by the skirt on the second piston 43.

On their opposite sides the arms 23 for the pistons 43 are formed with laterally extending lugs 48, and these lugs are in the path of engagement with pivoted spring influenced dogs 49 which are movable through pockets 50 on the ring part 4 of the cylinder 2. The spring influenced dogs are positioned to engage with the lugs only when the pistons 43 have been moved to the position disclosed by Figure 1 of the drawings or in other words when the compressed fuel is to be fired by the spark plugs. This engagement of the dogs with the lugs holds the pistons 43 from back or retrograde movement, but the explosion advances the main pistons 11. The stroke of the main pistons is continuous but the stroke of the pistons 43 is intermittent. The explosion advances the pistons 11 so that their buffer springs 16 will be brought into contact with the heads 40 of the nuts 39 to impart an initial movement to the pistons 43. Immediately thereafter the timing mechanism operates so that the rollers 31 are brought out of the longer passages provided by the grooved tracks and into contact with the end wall provided by such passages. This will cause the pistons 43 to rapidly advance in the direction of the pistons 11. Such movement of the pistons 11 uncovers the intake port, scavenges the fuel and causes the same to be forced through the exhaust port next to the advancing piston 43. The movement of the piston 43 over the said exhaust port will close the same. It is to be noted that the segmental ring members are also located so that the passage or opening of the inner periphery of the cylinder is closed during the firing stroke as well as when the mixture is drawn into the cylinder and exhausted therefrom. The continuously turning pistons 11 will draw in the fuel after they pass over the intake ports and the advancing pistons 43 will compress such fuel, after exhausting the burned fuel, as previously described, and when brought to their full compression strokes the pistons 43 are locked by the latches 49 to hold the said pistons from movement during the successive firing strokes.

The spaced filler or valve segments 20 are adjusted to a nicety by the lock bolt 22 in the passage provided therefor so that only a minimum amount of friction will occur between the said elements 20 and the inner side or confronting walls provided by the cylinder and its ring extension 4. A continuous circulation of water is directed around the cylinder 2 and the fin 7 materially assists in cooling the cylinder. The shaft 6 may have a fly wheel attached thereto and all of the inner and movable parts of the engine may be readily lubricated and as a matter-of-fact by fully or partially closing the ends of the cylinder the moving parts may be caused to travel in a bath of oil and the fin will assist in the splashing of such oil against the said moving parts and the bearings therefor.

Having described the invention, I claim:

A rotary internal combustion engine including a hollow casing having an annular cylinder thereon and said cylinder having an inner opening communicating with the casing, and said cylinder having upper and lower pairs of respective fuel intake and exhaust ports and having spark plugs entering the sides thereof, oppositely disposed main piston heads in the cylinder, a shaft journaled in the casing, an arm centrally fixed to the shaft having offset ends which enter the cylinder and are pivoted to the pistons, compressible buffers extending from the said ends of the arms, auxiliary pistons in the cylinder, arched rods pivotally secured to said pistons, an arm freely journaled on the shaft and to whose ends the rods are connected, segmental skirts carried by the auxiliary pistons for normally closing the intake and exhaust ports, segmental rings for closing the opening in the cylinder and for permitting the passage of the arms into said cylinder, adjustable means carried by the shaft holding the rings positioned, the main and auxiliary pistons when brought to the opposite side of the spark plugs designed to afford abutments for the explosions, means for latching the arms of the auxiliary pistons for preventing the retrograde movement of the auxiliary pistons from such explosions and said main pistons when traveling over the intake ports designed to suck an explosive mixture into the cylinder and the buffers on the arms of the said main pistons adapted to contact with the arms of the auxiliary pistons to release the latching means and timing means operated by the turning of the shaft for rapidly advancing the auxiliary pistons toward the main pistons to cause said auxiliary pistons to scavenge the exploded mixture through the exhaust ports, to close the intake ports and to arrange themselves in latched position when the main and auxiliary pistons are brought to the opposite sides of the spark plugs.

In testimony whereof I affix my signature.

GILBERT G. SATRUM.